Figure 1:
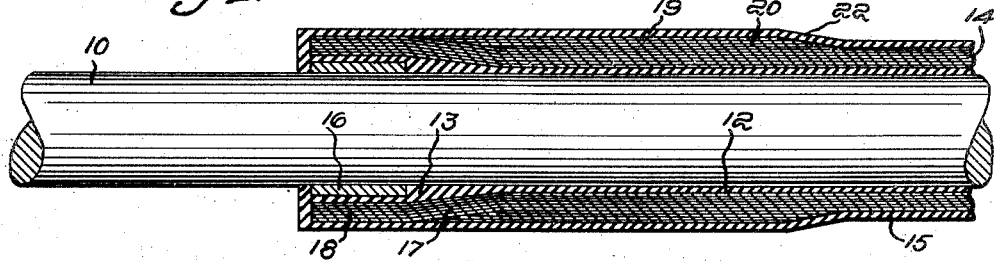

April 8, 1941.　　T. M. KNOWLAND　　2,237,490
HOSE NIPPLE CONNECTION
Filed Oct. 7, 1939　　2 Sheets-Sheet 1

Inventor:
Thomas M. Knowland,
by Kenway & Witter
Attorneys

April 8, 1941.　　　T. M. KNOWLAND　　　2,237,490
HOSE NIPPLE CONNECTION
Filed Oct. 7 1939　　　2 Sheets-Sheet 2
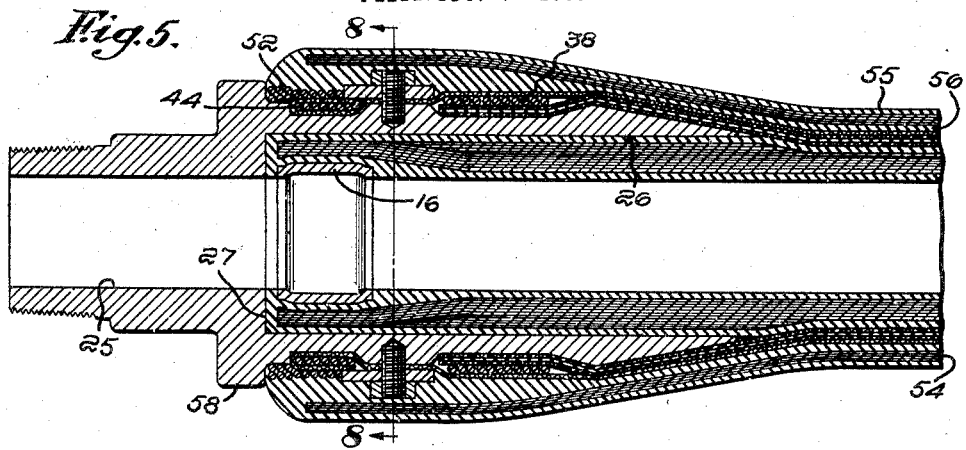
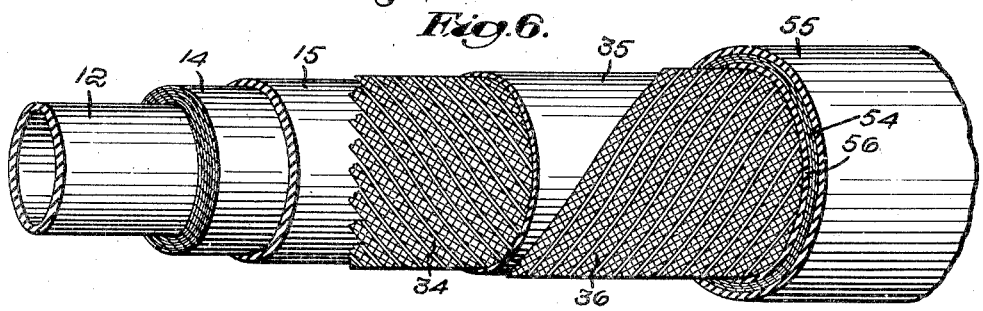
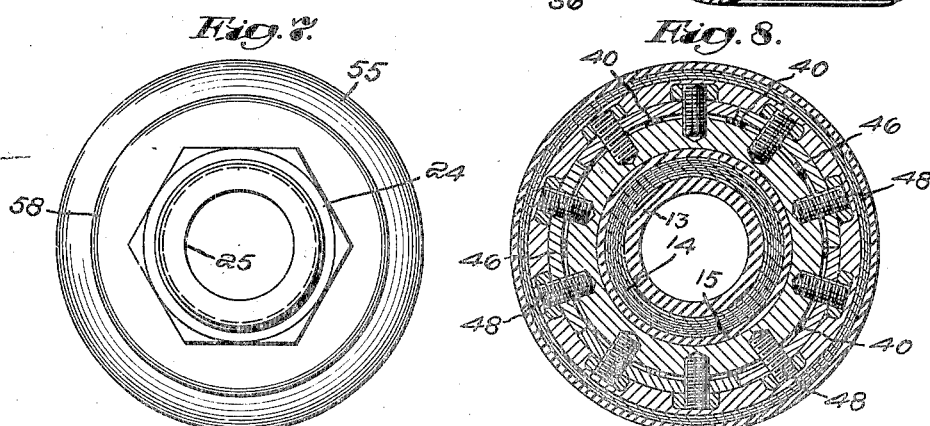
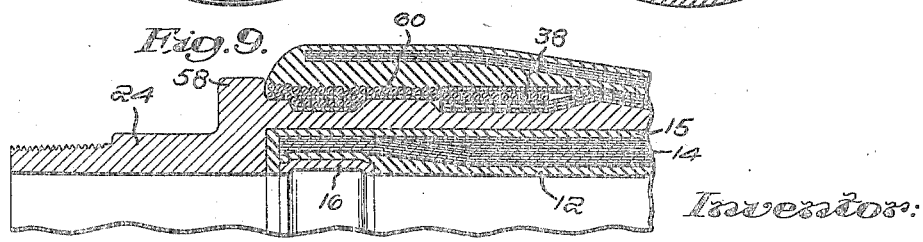
Inventor:
Thomas M. Knowland,
by Kenway & Witter
Attorneys Patented Apr. 8, 1941

2,237,490

UNITED STATES PATENT OFFICE 2,237,490

HOSE NIPPLE CONNECTION

Thomas M. Knowland, Belmont, Mass., assignor to Boston Woven Hose & Rubber Company, Cambridge, Mass., a corporation of Massachusetts Application October 7, 1939, Serial No. 298,484

5 Claims. (Cl. 285—80)

This invention relates to hose and nipple connections therefor embodying rubber or rubberized material in its construction and has particular relation to nipple connections for relatively high pressure hose. One important field of use for such hose is in the drilling of oil wells by rotary action which operation requires the use of relatively long hose capable of withstanding high pressures. For purposes of illustration the invention will be described in that relation, particularly since it involves very exacting requirements and some of the advantages incident to my invention are therefore emphasized in that field.

As far as my invention is concerned, the construction of the hose itself is of secondary importance. The hose will ordinarily comprise a tube of rubber constructed to retain liquid against penetration therethrough, and surrounding and protecting the tube are a plurality of plies of rubberized fabric. When the hose is required to withstand a considerable pressure, one or more reinforcing layers of wire or the like wound spirally thereabout and onto the fabric, will be provided and these layers will be enclosed within a suitable cover preferably of rubber.

The primary object of the invention resides in the production of an improved nipple connection for the hose and one novel feature thereof is such a connection which will provide a tight seal between the hose and nipple and form a passageway of full and unobstructed hose diameter through the connection. The connection includes a nipple adapted to receive an end of the hose thereinto and the tight seal and full passageway therethrough are formed by providing within and coaxially of the hose an expansible ring which, after the hose is assembled with the nipple, is expanded outwardly to bring and hold the hose in sealing contact with the nipple, and to such position that no part of the ring projects into the limits defined by the opening through the hose. As thus formed, the opening through the connection is free and unobstructed and no leakage can take place as long as the parts are retained in this position.

A further feature of the invention resides in so connecting the hose and nipple as to retain them in the position above described and prevent any separation thereof which might result in blowing the nipple from the hose under the high pressure for which the hose is adapted. The nipple is constructed to receive the hose therein as above described, and furthermore, in the preferred form of the invention, to receive thereover the wire reinforcement which surrounds the hose. This reinforcement may be anchored directly to the nipple and I prefer furthermore to employ other anchoring means secured directly to the wires and to the nipple for holding the nipple and hose against separating movement longitudinally. A preferred form of this construction is illustrated in the accompanying drawings.

Another feature of the invention resides in so constructing and covering the hose nipple connection as to provide a smooth and uniform exterior having no external clamps, fasteners or the like to catch obstructions and interfere with free handling of the hose. The construction of a hose embodying these and other novel and desirable features all of which result in a leakproof and rugged hose connection of the nature described comprises a further object of the invention.

Figure 2:
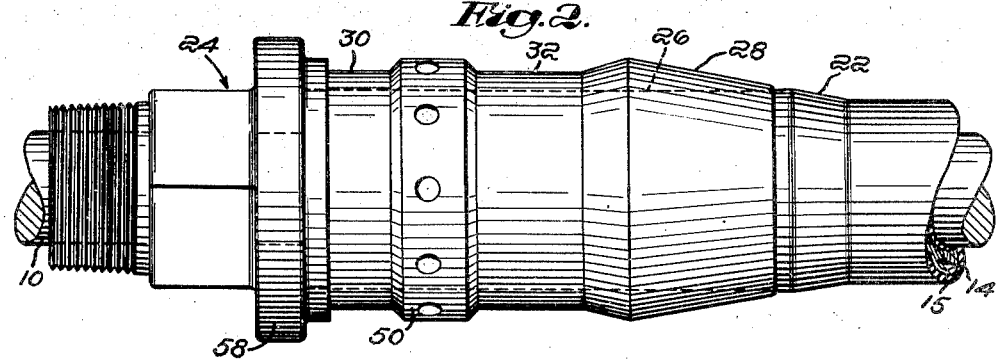
Figure 3:
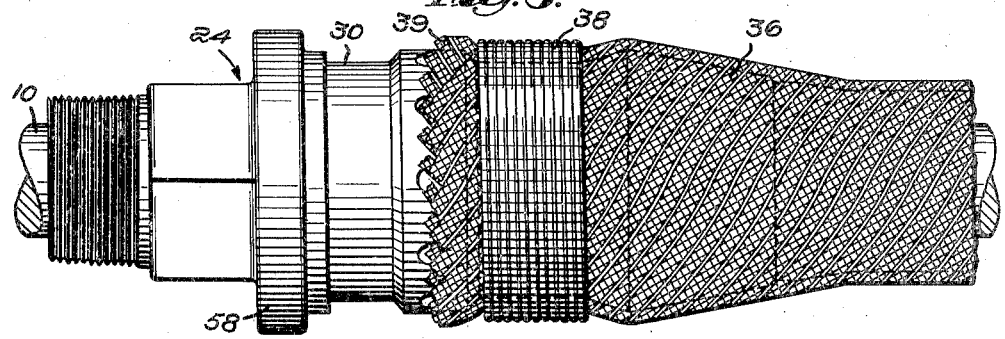
Figure 4:
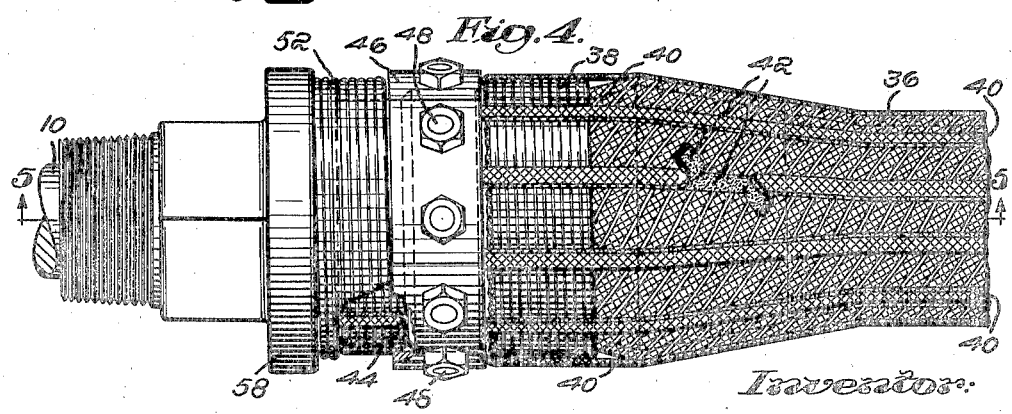

These and other features of the invention will be best understood and appreciated from the following description of preferred embodiments thereof selected for purposes of illustration and shown in the accompanying drawings in which:

Fig. 1 illustrates in sectional view the formation of a hose on a mandrel,

Fig. 2 illustrates this hose and mandrel within a connection nipple to be applied to the hose, Fig. 3 is a like view showing reinforcement on the hose body and extending over and secured to the nipple, Fig. 4 illustrates the further step of applying anchoring means to the reinforcement and nipple, Fig. 5 is a longitudinal sectional view through the completed connection, Fig. 6 illustrates a section of the hose broken away to show its construction, Fig. 7 is an end view of the completed connection shown in Fig. 5, Fig. 8 is a sectional view taken on line 8—8 of Fig. 5, Fig. 9 is a fragmentary sectional view of a modified construction.

In Fig. 1 I have, for convenience, shown the hose as constructed on a mandrel or pole 10. The hose embodies a rubber tube 12 having a plurality of plies 14 of rubberized duck or other fabric wound thereonto and covered with an outer layer of rubber 15. Disposed within the end of the tube 12 is an expansible ring 16 and the fabric plies 14 are built up over this ring at 17 and 18, the tube 12 being thickened at 13 to accommodate the ring. A portion 19 of the hose body is increased in diameter to correspond with its diameter at the ring, for some distance rearwardly of the ring, by the application of a plurality of plies of fabric 20 to the fabric 14, the junction of this portion with that of the hose body being tapered conically at 22.

The hose illustrated in Fig. 1, together with the mandrel 10, is inserted into the nipple 24 which is to be affixed to the hose to form the nipple connection. The opening through the nipple has a reduced diameter portion 25 at one end and the hose is inserted into the larger diameter portion 26, there being a shoulder 27 between the two portions. The length of the portion 26 substantially corresponds to the length of the enlarged end portion 19 of the hose and the rear end portion of the nipple is tapered at 28 to correspond substantially with the taper 22 of the hose when these two parts are combined as illustrated in Fig. 2. The body of the nipple is annularly recessed to present spaced circumferential depressions 30 and 32 for a purpose hereinafter described.

The tube 12 is adapted to conduct fluid through the hose and the fabric plies 14 serve to reinforce and back up the tube. Such reinforcement is, however, insufficient for high pressure hose used for drilling and like purposes and the next step of the invention embodies the application of the necessary further reinforcing of the hose shown in Fig. 2. My preferred method of providing this reinforcement comprises the winding of one or more layers of wires spirally about the hose, two of such layers 34 and 36 wound in opposite directions and a layer of rubber 35 therebetween being illustrated in Fig. 6. When the hose is vulcanized this rubber envelopes the wires and fills the gaps therebetween. These wire layers are continued from the hose onto the nipple to a point beyond the recess 32 as illustrated in Fig. 3. The end portions are then bound into the recess by a band 38 of wire or the like and the free ends 39 projecting outwardly of the band are removed.

It will be understood that the wires 34 and 36 serve to take all the bursting stresses, both longitudinally and transversely, which are set up in the hose by the internal fluid pressure. The extent of these stresses is considerable under high pressure and the longitudinal stress would blow the nipple from the hose were these two parts not securely anchored against separation. A further feature of the invention resides in providing an anchorage which will positively eliminate this possibility. My preferred embodiment comprises the use of a plurality of strong metallic elements 40, preferably of woven wire construction, extending longitudinally of the hose and relatively spaced therearound as illustrated in Fig. 4. These elements are soldered at 42 directly to the outer layer 37 of reinforcing wires and are carried over the nipple to a point beyond the recess 30. The ends of the elements are then bound into the recess by a band 44 of wire or the like. The free ends of the elements are bent back over the band as illustrated in Fig. 5. The elements 40 are furthermore secured to the nipple by a plurality of clamps or clamping plates 46 held down by clamping bolts and nuts 48, the elements being gripped between the clamps and a land 50 on the nipple. The clamps preferably overlap a portion of the band 44 which may be further secured by an outer band 52 of wire or the like.

The hose and nipple connection are finished by applying an outer cover thereto. This cover preferably comprises a plurality of fabric plies 54 located between rubber layers 55 and 56 and the cover extends to the collar 58 on the nipple whereby fully housing the nipple construction and leaving a free and unobstructed outer surface. After completion of the hose connection the ring 16 is expanded outwardly to form a secure seal as illustrated in Figs. 5 and 9.

It will be understood that the form of invention above specifically described is for purposes of illustration and that the construction can be considerably modified as is found desirable. In Fig. 9, for example, I have illustrated a construction generally similar to that above described but wherein the clamping plates 46 have been eliminated and a band 60 of wire or the like substituted therefore. This form of connection employs coils of wire as the sole clamping means on the nipple and it will be apparent that other and equivalent means can be provided wherever desired.

It will now be apparent that I have produced a new and superior hose nipple connection for pressure hose which will satisfy all necessary requirements. The hose and nipple are fully reinforced throughout their length and are so relatively and securely affixed as to preclude the blowing of the nipple from the hose under high pressure. Furthermore the interior of the hose provides a smooth and full diameter conduit for free flow of fluid through the hose and a strong and leak-proof joint between the hose and nipple. Another feature, of particular importance in drilling hose, resides in the exterior construction which fully houses the hose-nipple joint and leaves the outer surface of the hose free of all objectionable clamps, fasteners and the like and wholly unobstructed.

Having thus described my invention, what I claim as new and desire to secure by Letters Patent of the United States is:

1. A hose nipple connection, comprising a metallic nipple having two annular recesses therein and therearound, a hose extending into the nipple, a covering of metallic wires wound spirally about and reinforcing the hose, a portion of said covering overlapping the nipple and extending into one of said recesses, means providing a band extending about said overlapping portion of the covering at said one recess and binding it to the nipple within such recess, a plurality of metal anchoring elements extending longitudinally of the hose and in relatively spaced relation therearound, said elements being secured to said wires and extending to a position overlapping the nipple at the other recess, means providing a second band at said other recess binding the elements to the nipple within said other recess, and other means cooperating with the elements and nipple for anchoring them against separating movement longitudinally.

2. A hose nipple connection comprising a pipe-like metallic nipple, a hose extending into the nipple, a reinforcement covering including a layer of metallic wires wound spirally about the hose in one direction and a superposed layer thereof wound in the other direction, a layer of rubber located between the two wire layers and vulcanized in enveloping relation to the wires thereof, metallic means secured in metal to metal contact to the outer layer of wires and extending over the nipple, and means anchoring the metallic means to the nipple.

3. A hose nipple connection, comprising a metallic nipple, a hose extending into the nipple and in sealing contact therewith, metallic members extending in close relationship spirally about and reinforcing the hose against expansion, a plurality of metallic connecting elements extending longitudinally of and located in spaced relation about the hose, said elements being directly connected to the spiral convolutions of the metallic members and extending toward and exteriorly over the nipple, and means securing the elements to the nipple for anchoring the hose and nipple against separating movement longitudinally.

4. A hose nipple connection comprising a metallic nipple, a hose having an end portion extending into the nipple and in sealing contact therewith, wire reinforcement wound spirally about the hose, a plurality of metallic anchoring elements located in relatively spaced relation around the hose and extending longitudinally thereof to a position overlapping the exterior of the nipple, each of the elements extending transversely across and being directly anchored in metal to metal engagement with a plurality of convolutions of the reinforcement, and means anchoring the elements rigidly to the nipple.

5. The hose nipple connection defined in claim 4 in which an end portion of said reinforcement extends to a position overlapping the nipple, and which includes means providing a band extending about said overlapping portion of the reinforcement and binding it to the nipple, and anchoring elements extending over the band to a position beyond the reinforcement, and means engaging the said anchoring elements beyond the reinforcement, and binding them rigidly to the nipple.

THOMAS M. KNOWLAND.